United States Patent
Hand, III et al.

(10) Patent No.: US 10,131,245 B2
(45) Date of Patent: Nov. 20, 2018

(54) ELECTRIFIED VEHICLE DC POWER CONVERSION WITH DISTRIBUTED CONTROL

(71) Applicant: FORD GLOBAL TECHNOLOGIES, LLC, Dearborn, MI (US)

(72) Inventors: Michael J. Hand, III, Ypsilanti, MI (US); Richard Dyche Anderson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 282 days.

(21) Appl. No.: 15/238,003

(22) Filed: Aug. 16, 2016

(65) Prior Publication Data
US 2018/0050603 A1 Feb. 22, 2018

(51) Int. Cl.
B60L 1/00 (2006.01)
B60L 3/00 (2006.01)
(Continued)

(52) U.S. Cl.
CPC ....... B60L 11/1866 (2013.01); B60L 11/1812 (2013.01); H02J 1/14 (2013.01);
(Continued)

(58) Field of Classification Search
CPC . B60L 11/1812; B60L 11/1866; H02J 7/0019; H02J 1/14
See application file for complete search history.

(56) References Cited

U.S. PATENT DOCUMENTS 6,873,134 B2  3/2005 Canter et al.
7,196,493 B2  3/2007 McGee et al.
(Continued)

FOREIGN PATENT DOCUMENTS

CN  100345362 C  12/2005
JP  3334742  10/2002
(Continued)

OTHER PUBLICATIONS

M. Muneeb Ur Rehman, et al., Control of a Series-Input, Parallel-Output Cell Balancing System for Electric Vehicle Battery Packs, Electrical and Computer Engineering, Utah State University, Logan Utah USA, Electrical, Computer and Energy Engineering, University of Colorado, Boulder Colorado USA, 978-1-4673-6847-6/15 © 2015 IEEE.

*Primary Examiner* — Alfonso Perez Borroto
*Assistant Examiner* — Esayas Yeshaw
(74) *Attorney, Agent, or Firm* — David B. Kelley; MacMillan, Sobanski & Todd, LLC (57) ABSTRACT

An electrified vehicle has a battery pack comprising series-connected battery units providing a main voltage. To supply a lower voltage bus equally from all battery units, a plurality of DC/DC converters are powered by respective units and have their outputs in parallel. A central module has an outer loop controller generating a target current to regulate the bus voltage to a predetermined voltage and has an allocator distributing the target current into a plurality of allocated current commands according to respective states of charge of the battery units. A plurality of local controllers each adjusts a current of a respective DC/DC converter. Each local controller receives a respective allocated current command as a respective feedforward control variable. Each local controller uses an error between the bus voltage and the predetermined voltage to be integrated as a respective feedback control variable only when the error is above a threshold.

20 Claims, 4 Drawing Sheets

(51) Int. Cl.
 *H02G 3/00* (2006.01)
 *B60L 11/18* (2006.01)
 *H02J 1/14* (2006.01)
 *H02J 7/00* (2006.01)
(52) U.S. Cl.
 CPC ............ *H02J 7/008* (2013.01); *H02J 7/0018* (2013.01); *H02J 7/0019* (2013.01)

(56) References Cited

U.S. PATENT DOCUMENTS

| | | | |
|---|---|---|---|
| 7,439,634 B2 * | 10/2008 | Michalko | H02J 4/00 |
| | | | 307/43 |
| 7,633,783 B2 | 12/2009 | Manabe et al. | |
| 7,750,505 B2 | 7/2010 | Ichikawa | |
| 7,894,216 B2 * | 2/2011 | Melanson | H02M 1/4225 |
| | | | 363/21.13 |
| 8,115,446 B2 | 2/2012 | Piccard et al. | |
| 8,395,280 B2 | 3/2013 | Graovac et al. | |
| 8,542,509 B2 | 9/2013 | Sagneri et al. | |
| 8,772,967 B1 | 7/2014 | Ikriannikov et al. | |
| 8,872,498 B2 | 10/2014 | Goetzenberger et al. | |
| 8,912,736 B2 | 12/2014 | Kim et al. | |
| 9,886,233 B2 * | 2/2018 | Innes | G06F 3/165 |
| 2008/0042493 A1 | 2/2008 | Jacobs | |
| 2009/0195213 A1 * | 8/2009 | Li | H02J 7/0016 |
| | | | 320/136 |
| 2010/0172063 A1 * | 7/2010 | Liu | H02H 1/04 |
| | | | 361/118 |
| 2014/0111016 A1 * | 4/2014 | He | H02M 3/285 |
| | | | 307/82 |
| 2014/0354228 A1 * | 12/2014 | Williams | B60L 11/1844 |
| | | | 320/109 |
| 2015/0069950 A1 * | 3/2015 | Ishibashi | H02J 3/32 |
| | | | 320/101 |
| 2015/0214757 A1 | 7/2015 | Zane et al. | |

FOREIGN PATENT DOCUMENTS

JP 3969165 9/2007
JP 5207055 6/2013

* cited by examiner

ELECTRIFIED VEHICLE DC POWER CONVERSION WITH DISTRIBUTED CONTROL

STATEMENT REGARDING FEDERALLY SPONSORED RESEARCH

This invention was made with Government support under Contract No. DE-AR0000271 awarded by the Department of Energy. The Government has certain rights to the invention.

CROSS REFERENCE TO RELATED APPLICATIONS

Not Applicable.

BACKGROUND OF THE INVENTION

The present invention relates in general to electric power systems for electric vehicles, and, more specifically, to methods and apparatus for controlling DC/DC converters to convert a high voltage from a battery pack to a lower voltage for use on a low voltage bus in an electric vehicle.

Electrified vehicles such as battery electric vehicles and hybrid-electric vehicles typically utilize a high voltage power bus driven by a DC power source which may include storage and/or conversion devices such as a multi-cell battery pack. The battery pack may have a plurality of battery cells connected in series in order to provide the necessary power and/or voltage levels. The battery cells require real-time monitoring in order to maximize efficiency and performance, as well as to determine a battery state-of-charge (SOC) to predict a remaining driving range under battery power. Common battery types such as lithium ion (Li-Ion) use a large number of individual battery cells stacked together (connected in series and/or parallel), and groups of cells may be connected hierarchically in groups with monitoring of the groups rather than individual cells. As used herein, battery unit refers to an individual cell or a group of cells treated together.

In addition to the high voltage components associated with driving traction motors in the electrified vehicle, the vehicle also contains lower voltage electrical components and accessories (e.g., control modules, lighting, communications, and entertainment devices) as well as a lower voltage battery for supporting the low voltage components. In order to supply power from the main, high voltage battery pack to the low voltage components and/or to recharge the low voltage battery, a DC/DC converter has been used to down convert the high voltage to an appropriate lower voltage to drive a low voltage power bus.

Although it would be possible to tap into a small section of the battery pack to obtain the lower voltage, the resulting unbalanced drain of power from the battery pack would be undesirable. On the other hand, using a single DC/DC converter driven directly across the full high voltage of the battery pack requires high voltage components in the converter which results in a high cost. In order to obtain the necessary voltage conversion and to balance the electrical load among the plurality of battery cells, a bank of DC/DC converters has been used with the input of each converter connected to a different battery cell (or unit of cells) and with the converter outputs connected in parallel, as shown for example in U.S. Pat. No. 8,115,446 of Piccard et al, the disclosure of which is incorporated herein by reference.

A typical battery cell in the battery pack may generate about 4V. A target or setpoint voltage for the low voltage bus may be about 14V, for example. If each DC/DC converter covers one cell, then it is controlled to increase the voltage from 4V to 14V. If each converter covers six cells in series, then it is controlled to decrease the 24V across its input to the desired 14V.

U.S. patent application publication 2015/0214757A1 of Zane et al. discloses a plurality of DC/DC bypass converters with the outputs likewise connected in parallel, wherein operation of each converter is individually adjusted according to a battery state for its respective battery unit, to thereby decrease a rate of divergence of the battery state from a reference state. Thus, the states of charge for the battery units are more uniform, which improves overall performance of the battery pack. However, a side effect of independently varying the power from each DC/DC converter is that the common output voltage derived from the parallel connection of the converters may not remain constant at the desired value or range of values. A resulting voltage instability on the low voltage DC bus can be detrimental to component operation and to a rapid loss of life of the low voltage battery, especially since the total low voltage power loading may change rapidly during vehicle use.

In copending U.S. application Ser. No. 15/237,994, filed concurrently herewith, entitled "Electrified Vehicle Power Conversion for Low Voltage Bus," which incorporated herein by reference in its entirety, a control strategy is disclosed wherein a first controller receives an actual bus voltage. The first controller generates a target total current in response to the bus voltage which is adapted to regulate the actual bus voltage to a target voltage. A second controller distributes the target current into a plurality of allocated current commands for respective converters according to respective states of charge of the battery units connected to the converters. As a result, power is drawn from the battery units in a way that balances their states of charge while a stabile voltage is maintained on the low-voltage bus.

Copending U.S. application Ser. No. 15/237,994 includes a distributed control architecture wherein a central control module determines both 1) the combined current flow to be obtained that regulates the common converter output voltage to the setpoint voltage, and 2) the distribution or allocation of that total current among the converters which results in the desired balancing of the battery unit states of charge. In the distributed architecture, the allocated current commands are transmitted to each DC/DC converter where a controller is responsible for regulating the output of the converter so that it achieves the allocated current. In order to maintain the desired output voltage without degrading the allocated current too much or for too long, this system must update the commanded current to each converter quite quickly. A fast response time is needed because output load demands on the low-voltage bus (e.g., power steering, headlights, radio, etc.) change very quickly and unpredictably since many can be switched on or off at any time by the vehicle occupants. Detailed analysis and simulations suggest that a maximum sample interval of 1 ms for updating the commands should be maintained. While achieving this update rate is possible, it would require more communication bandwidth than is available from currently available on-vehicle protocols (e.g., CAN, SPI, etc.). To speed up the communication, a dedicated communication bus could be employed, but would result in added cost and complexity.

It would be desirable to maintain output voltage control together with the cell balancing logic, without necessitating a large communication bandwidth or the associated extra costs.

SUMMARY OF THE INVENTION

The present invention provides a distributed/cascaded control approach wherein an outer controller provides slow, coarse control of the total current needed and the distribution of the current to achieve cell balancing. The current commands are updated within the bandwidth limitations of existing communications architectures for electrified vehicles. These current commands are sent over the low speed communication bus to the local controllers situated at each of the converters. The local controllers use the current commands as well as local feedback on the output voltage to specify the final current draw into each of the converters.

In one aspect of the invention, an electrified vehicle apparatus comprises a battery pack comprising series-connected battery units providing a main voltage. A plurality of DC/DC converters each has an input powered by a respective battery unit. The DC/DC converters have respective outputs coupled in parallel to a low-voltage bus. A central module has an outer loop controller generating a target current adapted to regulate a bus voltage on the low-voltage bus to a predetermined voltage and an allocator distributing the target current into a plurality of allocated current commands for respective DC/DC converters according to respective states of charge of the battery units connected to the DC/DC converters. A plurality of local controllers each adjusts a current of a respective DC/DC converter. Each local controller receives a respective allocated current command as a respective feedforward control variable. Each local controller uses an error between the bus voltage and the predetermined voltage as a respective feedback control variable.

DETAILED DESCRIPTION OF PREFERRED EMBODIMENTS

The term "electrified vehicle" as used herein includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery or other DC source supplies energy for vehicle propulsion. A HEV includes an internal combustion engine and an electric motor, wherein the energy source for the engine is fuel and the energy source for the motor is a DC storage unit such as a battery. In a HEV, the engine is the main source of energy for vehicle propulsion with the battery providing supplemental energy for vehicle propulsion (e.g., the battery buffers fuel energy and recovers kinematic energy in electric form). A PHEV is like a HEV, but the PHEV may have a larger capacity battery that is rechargeable from the external electric grid. In a PHEV, the battery may be the main source of energy for vehicle propulsion until the battery depletes to a low energy level, at which time the PHEV operates like a HEV for vehicle propulsion.

A typical battery system may include a main battery pack and at least one battery energy controller module (BECM) for monitoring both individual cells and the battery pack as a whole. There may typically be one master BECM with satellite modules with additional sensing and processing. An output of the battery pack is connected via a high voltage bus to an inverter which converts the direct current (DC) power supplied by the battery pack to alternating current (AC) power for operating a traction motor in accordance with commands from a transmission control module (TCM), for example. The BECM, together with various sensors associated with the battery pack, monitors cell voltages, currents, temperatures, and state of charge, for example. The monitored parameters may be used to control various aspects of the electrical power system.

Figure 1:
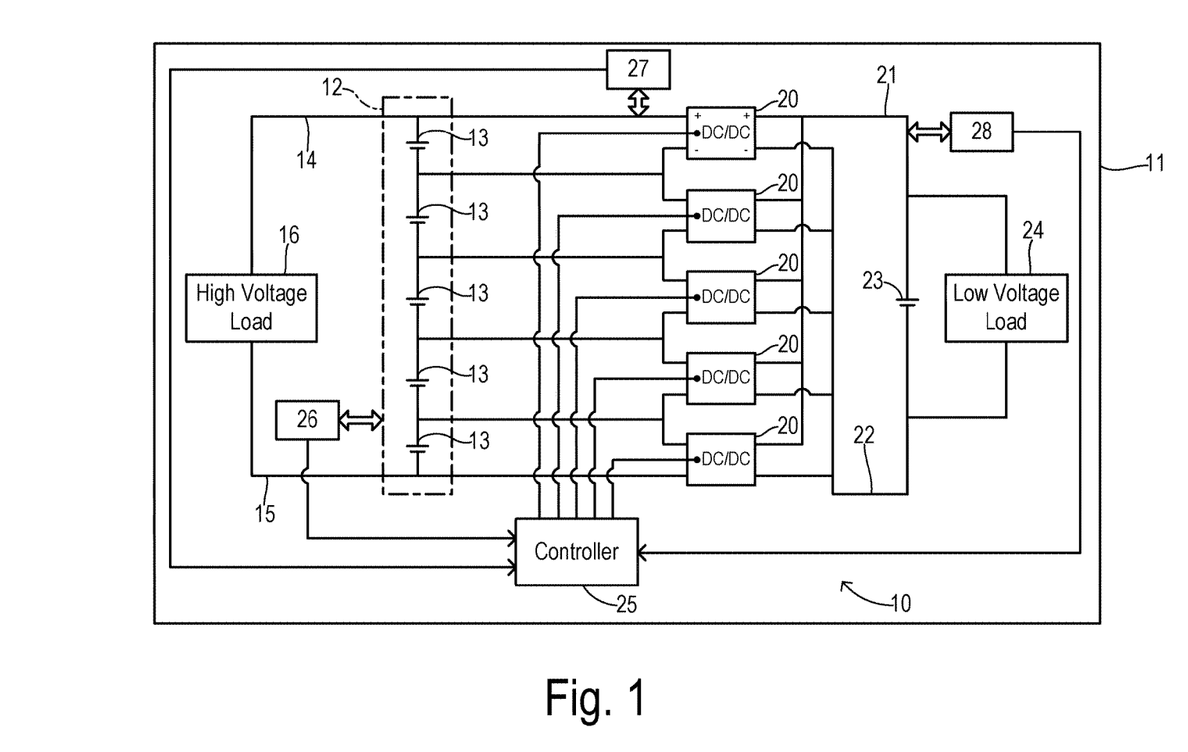
FIG. 1 is a block diagram of an embodiment of an electrical power system according to the invention.

Referring now to FIG. 1, an electrical power system 10 for an automotive vehicle 11 includes a battery pack 12 having a plurality of high-voltage battery units 13 connected in series to produce a main output voltage of hundreds of volts. Each battery unit 13 may include one or more cells (e.g., Lithium cells). The main output voltage is applied between a positive high-voltage bus 14 and a negative high-voltage bus 15 for use by high-voltage loads 16 (e.g., an inverter and traction motor). A plurality of DC/DC power converters 20 each has its respective input coupled across a respective one of battery units 13. The outputs of converters 20 are all connected in parallel between a positive low-voltage bus 21 and a negative low-voltage bus 22 for charging a low-voltage (e.g., lead acid) battery 23 and for use by low-voltage loads 24.

A typical configuration for DC/DC power converters 20 may include an input inverter bridge, a resonant circuit (e.g., transformer), and an output rectifier. As known in the art, MOSFETs or other switching devices in the inverter can be switched according to a variable duty cycle and/or frequency in order to regulate an output voltage or current that is output from the rectifier. Thus, a controller 25 is coupled to each converter 20 in order to command a desired operation of each converter. A plurality of sensor arrays 26, 27, and 28 are connected to controller 25 in order to provide parameter measurements necessary to allow controller 25 to properly regulate converters 20. Sensor array 26 may be comprised of at least one BECM for monitoring state of charge, voltage, and current for individual cells or battery units and for the battery pack as a whole. Sensor array 27 is an optional element that monitors input current flowing to each of the converters 20.

Sensor array 28 monitors bus voltage (and optionally the bus current) at low voltage bus 21/22. Using the actual bus voltage, controller 25 is able to provide improved regulation of converters 20 so that undesirable voltage fluctuations on the low-voltage bus are avoided. Such fluctuations are a disadvantage of the prior art.

The common output voltage from the parallel DC/DC power converters is a function of the average of the individual converter input voltages, the sum of the output currents, and the sum of the input currents. Since the output currents and the input voltages are not controllable, the only means of controlling the common output voltage is through regulating the sum of the input currents. Thus, the present invention employs a control strategy which allows a system of multiple DC/DC converters whose outputs are connected in parallel to be controlled to reach a target output voltage by directly considering the input currents. The added controller strategy works independently of the manner in which the total current is distributed among the converters. In other words, regulating the sum total of the currents may be comprised of a separate control loop from the strategy that balances the states of charge of the individual battery units. This total input current is then distributed among the converters according to a distinct distribution method (such as the method suggested in Zane et al publication US 2015/0214757A1.

Controller 25 is preferably comprised of a feedback controller in order to specify a total input current target based on a target voltage (i.e., setpoint voltage for the low-voltage bus) and the measured common output voltage from the DC/DC converters. Controller 25 can be static (i.e., relying only on the present values of the signals) or dynamic (i.e., relying on present and past values). Controller 25 can be purely feedback (relying only on the error between the setpoint voltage and the measured output voltage) or it can also make use of a feedforward term which is calculated from other measured or estimated values.

Figure 2:
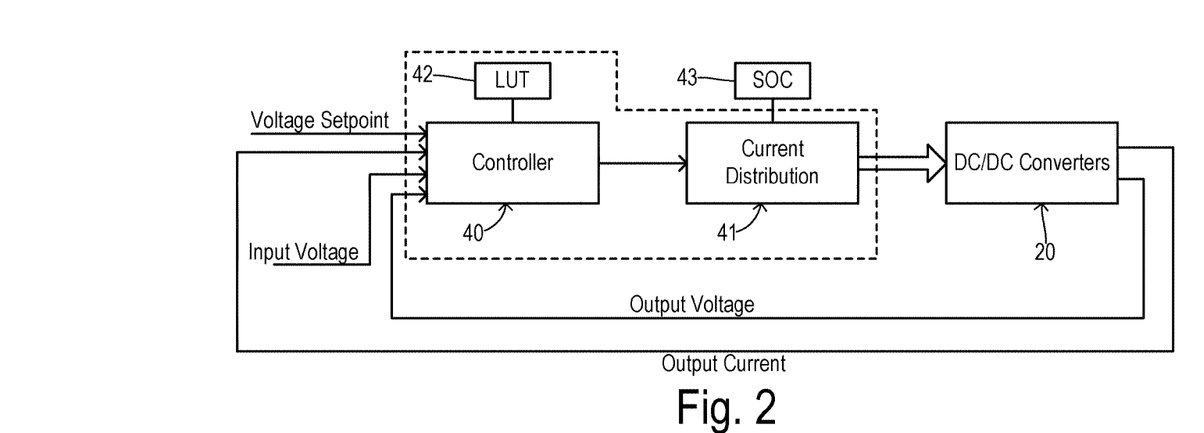
FIG. 2 is a block diagram showing the invention for controlling the DC power converters.

FIG. 2 shows one preferred embodiment of controller 25 comprising a total current regulation block 40 and a current distribution block 41. Current regulation block 40 serves as an outer loop controller which receives a voltage setpoint (e.g., a target voltage of 15V for the low-voltage bus) and measured parameter values including an actual bus output voltage and actual bus output current. Current regulation block 40 also receives a measured value for the average input voltage to the converters (i.e., the average output voltage from the respective battery units used for powering the converters). The average battery unit voltage may be obtained from the BECM system, for example. Current regulation block 40 is preferably connected to a lookup table 42 which stores various control values according to the regulation strategy that is employed.

Current distribution block 41 serves as a control loop which receives the target total current from current regulation block 40 and distributes the target current into a plurality of allocated current commands for respective DC/DC converters 20 according to (e.g., in proportion to) respective states of charge (or the cell voltages) of the battery units connected to the DC/DC converters. The states of charge (SOC) are obtained from an SOC block 43 which may be comprised of the BECM system, for example. The target total current signal is a scalar value which is to be distributed. In order to avoid overload of wiring and other issues, the target total current is limited to some predetermined maximum value by regulation block 40. The distributed (i.e., allocated) current signal is a vector of current commands which is sent to the various power converters.

In one embodiment, controller 25 can be a proportional-integral-derivative (PID) controller, wherein any of the P, I, or D terms of the controller may be set to 0. In such an architecture, the regulated output is driven by the error between the setpoint (i.e., target) voltage and the measured voltage, although the derivative term could alternatively be driven solely by the measured voltage.

In another embodiment, current regulation block 40 in controller 25 makes use of a feedforward control law based on a steady-state characterization of the input-output power conversion equation for the overall converter. A common representation of the power balance is given by $V_{in} \cdot I_{in} \cdot \eta = V_{out} \cdot I_{out}$, where $\eta$ is the conversion efficiency. The conversion efficiency of a converter may depend on the input and output voltages or other parameters. Input voltage $V_{in}$ is an average of the individual voltages supplied from each respective battery unit to its respective DC/DC converter. Input current $I_{in}$ is the sum of all the individual input currents, and output current $I_{out}$ is the sum of all the individual output currents. A preferred expression for the feedforward law is:

$$I_{in} = \frac{v_{des} \cdot I_{out}}{v_{in} \cdot \eta}$$

where $I_{in}$ is the target current to be drawn by the DC/DC converters in combination, $v_{des}$ is the desired target voltage for the low-voltage bus, $I_{out}$ is the actual bus current, $v_{in}$ is an average of the voltages supplied by the battery units, and $\eta$ is the conversion efficiency. If one or more of the required values is not measurable, it may be replaced by an estimated value or a representative constant (any of which could be stored in LUT 42, for example). The feedforward term can also account for changes in other parameters. Conversion efficiency $\eta$ can be a constant value built into the regulator, obtained based on dynamic conditions from LUT 42, or calculated using an online, adaptive regression. In addition, conversion efficiency could be obtained by a mathematical function, wherein $\eta = f(V_{in}, T, I, \ldots)$.

In addition to purely feedback or feedforward control strategies for the outer control loop that determines the target input total current, a combination of feedback and feedforward control variables may be used. For example, a feedback control variable from a PID controller can be added to a feedforward control variable obtained using the feedforward law described above.

Figure 3:
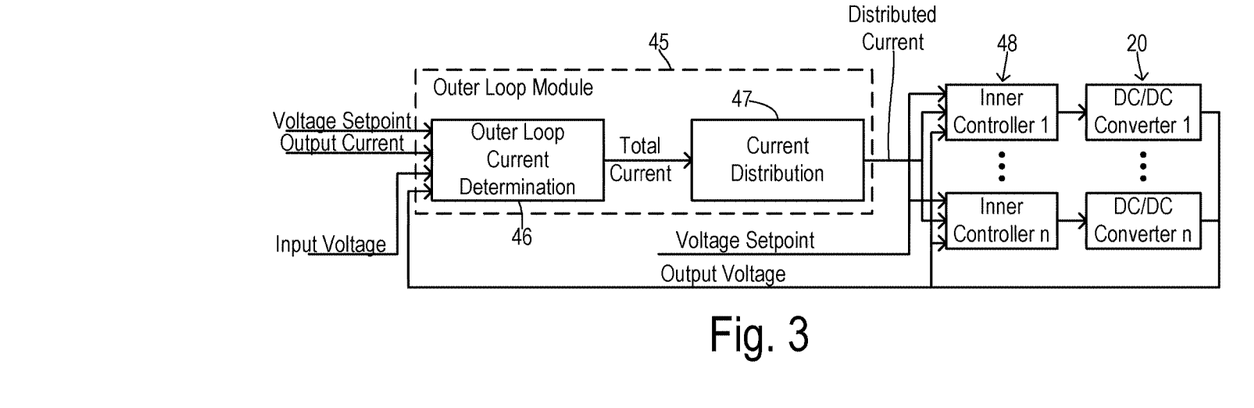
FIG. 3 is a block diagram showing a distributed/cascade architecture of the invention.

FIG. 3 shows an alternative embodiment of the invention using the distributed control approach of the present invention. A main "outer loop" module 45 includes an outer loop current determination block 46 (which may have a function which is identical to block 40 in FIG. 2) and a current distribution block 47. Outer loop block 46 determines the total target input current required to maintain the output voltage, and then block 47 determines a current distribution among the respective DC/DC converters based on a remaining state of charge of each respective battery unit (e.g., assigning current values so that energy is drawn from the battery units in a manner that restores balance to, i.e., equalizes, the states of charge) in the same or a similar manner as block 41 in FIG. 2. Alternatively, a measured cell voltage could be used instead of the state of charge. Each of the resulting n allocated current command values are sent to a respective inner or local controller block 48, wherein each inner controller block 48 resides as a local control node in a respective circuit module with a respective one of converters 20. Inner controller blocks 48 utilize the current command values, along with feedback control on the output voltage, to determine a final current to be generated.

In the distributed/cascaded control approach, the outer controller provides slow, coarse control of the total current needed and the distribution thereof to achieve cell balancing. The resulting allocated current commands are within the bandwidth limitations of existing communication architectures. The current commands are sent over regular communication bus to local controllers situated at each of the DC power converters. The local controllers use the commanded value together with feedback based on the output voltage in order to specify a final current draw into each of the converters.

Figure 4:
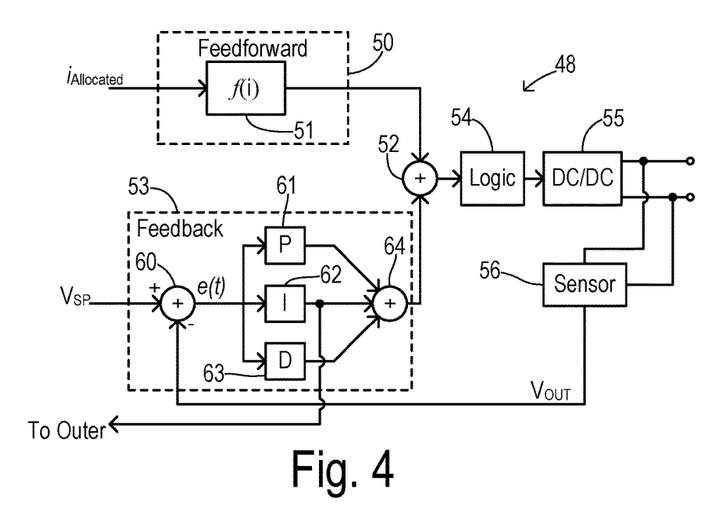
FIG. 4 is block diagram showing one preferred embodiment for a local controller for one DC/DC converter.

FIG. 4 shows a local controller 48 in greater detail. A feedforward section 50 receives a respective allocated current command from the outer loop module to generate a feedforward control variable according to a transfer function 51, designated as $f(i_{allocated})$, which may include a calibration or scaling function, for example. The resulting feedforward control variable is coupled to a positive input of an adder 52. A feedback control section 53 preferably includes a PID controller to generate a feedback control variable which is input to a second positive input of adder 52. The summed control variables are provided to a logic block 54, which may perform known control functions such as saturation avoidance (e.g., by saturating at some arbitrary value), applying rate limiting to the output, and/or transforming the desired current to an actual input command (e.g., duty cycle). A modified control signal is provided from logic block 54 to a respective DC power converter 55 which has its output connected to the common output of all the power converters. A voltage sensor 56 senses the output voltage from converter 55 and provides a measured output voltage signal to one input of a subtractor 60 in feedback section 53. A second input of subtractor 60 receives the voltage setpoint or target (e.g., 14V). Thus, subtractor 60 generates an error signal which may be input to a proportional processing block 61, an integral processing block 62, and a derivative processing block 63, all having their outputs combined in an adder 64 to generate the feedback control variable. The input of block 63 could instead receive the output voltage $V_{out}$. By combining the feedforward control variable with the feedback control variable, the invention shown in FIG. 4 has the ability to rapidly achieve and maintain a DC power converter input current which is regulated to the allocated current command while substantially maintaining the desired output low-voltage.

As mentioned above, the ability of the distributed control approach to maintain tight control of the output voltage may depend on rapid communication between outer loop module 45 and each of the inner controllers 48. Since sufficient communication rates may be difficult to support without the use of a dedicated communication bus, the distributed system may result in increased costs. In order to avoid the need for a fast communication bus while simultaneously maintaining robust voltage control together with the balancing of the battery unit states of charge, the present invention includes additional control strategies the improve the interaction between outer and inner control loops.

One requirement for effectively distributing the total current among the converters is that the outer loop must maintain a good approximation of the current at each converter (especially in steady state). If this is violated, then there is no guarantee that the intended distribution will be achieved or that any appreciable cell balancing will take place. One way of achieving this would be to require integral control in the outer loop and to require finite DC gain control (i.e., no integrator) in the inner loops. Another requirement is that because the low-voltage output load (and accordingly current and voltage) can change very quickly and by a large amount, disturbance rejection must be able to be handled autonomously by the inner loop, and the inner loop must be able to account for large, growing disturbances (e.g., changes in output load/current). In order to meet this requirement, integral control is effectively required in the inner loop. There requirements lead to conflicting design criteria.

To overcome the conflict, the invention provides two solutions to the problem. Each solution works well independently, and they can perform optimal performance when used together. The first solution is an outer-band unwinding integral control, wherein the inner loop provides integral control only when necessary for disturbance rejection and then provides a finite DC gain the rest of the time. The second solution introduces a sharing of integral action between the inner and outer loops.

Figure 5:
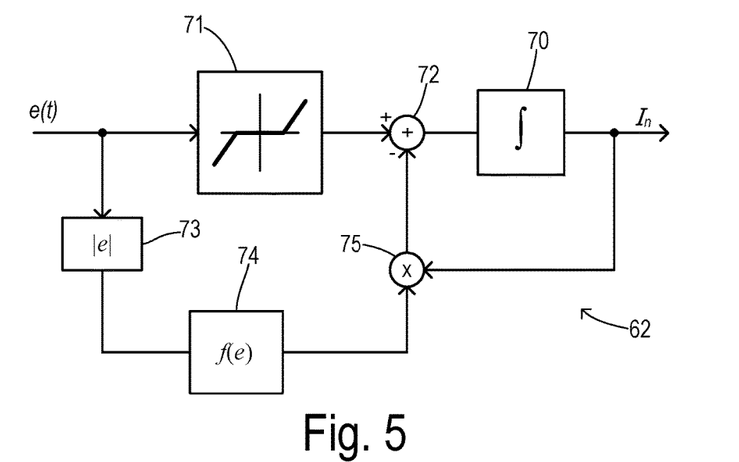
FIG. 5 is a block diagram showing an outer band unwinding controller for an integral portion of the local controller of FIG. 4.

In order to implement the "outer-band unwinding integral" controller, integral processing block 62 in FIG. 4 can be constructed according the elements shown in FIG. 5. Integral block 62 includes an integrator 70 connected to receive the error signal e(t) (from adder 60 in FIG. 4) via a dead-zone block 71 and an adder 72. Dead-zone block 71 performs a dead-zone function wherein error signal e(t) is 1) set to zero whenever the error is less than an error threshold $e_{TH}$ and 2) set to a value that reduces the absolute value of the error by an amount equal to the error threshold $e_{TH}$ whenever the error is greater than the error threshold $e_{TH}$. Because of the dead-zone function, integrator 70 is only driven with an error term if it is larger than a prescribed dead band. Thus, when low-voltage bus operation is in steady state, integrator 70 is essentially turned off. In other words, when error signal e(t) is low, the inner controller works with a finite DC gain and without integration. Only when a sufficiently large disturbance occurs does the inner controller respond as an integral controller.

To quickly recover from the integral action after the disturbance subsides, an "unwinding" action is obtained using negative feedback of the output of integrator 70 to its input. More specifically, when error signal e(t) is smaller than error threshold $e_{TH}$, the negative of the integrator output after scaling by a gain factor is fed back to the input, causing the output to asymptotically decay to zero. In FIG. 5, output $I_n$ of integrator 70 is fed back to a subtracting input of adder 72 after being scaled by the gain factor in a multiplier 75. The gain factor is determined according to an absolute value of error signal e(t) as an input to a ramp-down function $f(e)$ in a block 74. Ramp-down function $f(e)$ is less than some predetermined maximum value and has a value of zero when the error is greater than error threshold $e_{TH}$ (so that the decay or "unwinding" is only active when active integration is not desired). Ramping down integrator output $I_n$ allows the integrator of the outer loop to take over so that the desired battery cell balancing can be maintained at steady state while still allowing the inner loop to reject large, especially growing, disturbances.

Figure 6:
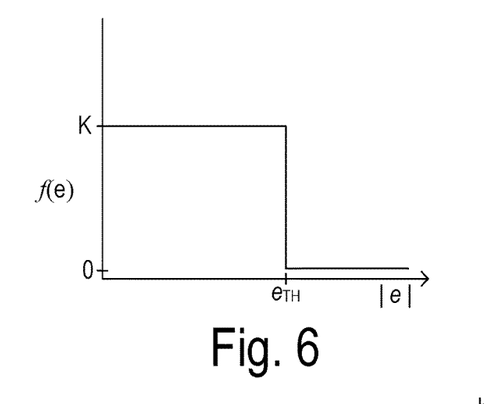
FIGS. 6 and 7 are function plots showing examples of a decay function of FIG. 5.
Figure 7:
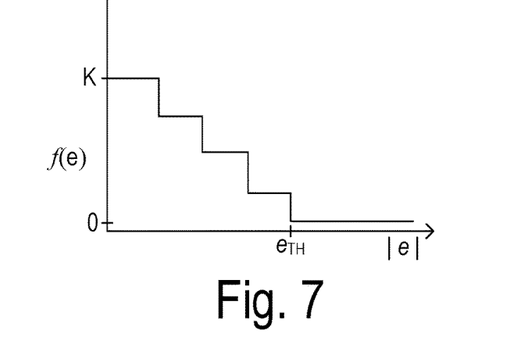

Based on the size of the input, the outer-band unwinding integral controller acts in one of two modes. In the first mode, it is an ordinary integrator. In the second mode, it acts as a lowpass filter with a zero input in order to drive the integrator state/output to zero. This behavior is tuned based on the size of the dead zone and the function $f(e)$. In one simple form shown in FIG. 6, the value of $f(e)$ is zero when the input error absolute value is outside the dead zone (i.e., greater than $e_{TH}$) and some constant K when it is inside the dead zone. Another form shown in FIG. 7 defines ramp-down function $f(e)$ with multiple steps from a value of K at zero error down to a value of zero at threshold error $e_{TH}$, wherein the intermediate step values are inversely proportional to the size of the input.

Figure 8:
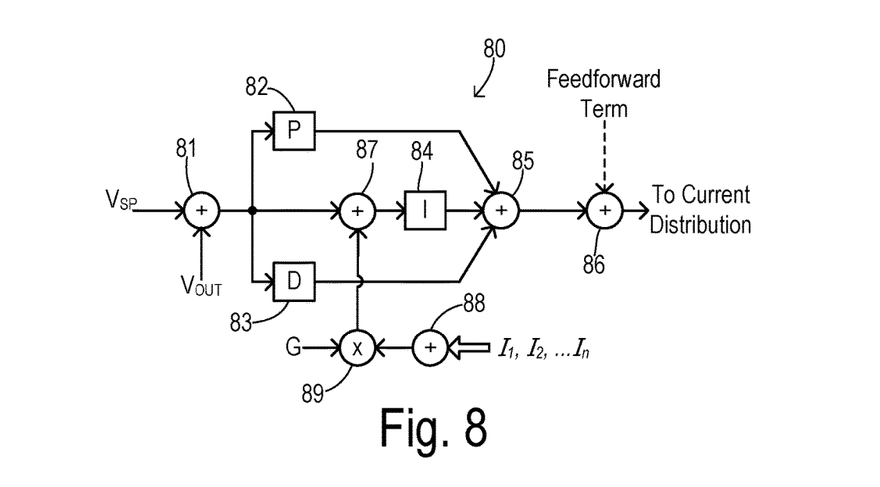
FIG. 8 is a block diagram of an outer loop controller using shared integral action with DC/DC converter local controllers.

The second solution for resolving the conflict raised by integral feedback control terms of the inner and outer loops (which can be used with or without the above outer-band unwinding integral controller in the inner loop) introduces a sharing of integral action between the inner and outer loops. More particularly, the outputs $I_n$ of all the inner loop integrators are broadcast back to the outer loop controller as shown in FIG. 8. Thus, a PID controller 80 in the outer loop determines the total target input current in response to an error signal from an adder 81 that compares the setpoint voltage $V_{SP}$ to the actual voltage $V_{out}$. The error signal is coupled to a proportional block 82 and a derivative block 83, and to an integral block 84 via an adder 87. The non-integral terms (especially the derivative term) can be zero. The outputs of blocks 82-84 are added in an adder 85 to provide a feedback control variable which can optionally be added to a feedforward control variable in an adder 86 in order to provide the total target current to the current distribution function.

The values of all the integral terms from the respective DC/DC converter inner local controllers ($I_1, I_2, \ldots, I_n$) are added in an adder 88. The terms can be transmitted at a slow update rate so that no fast, dedicated bus is required. The sum from adder 88 is scaled in a multiplier 89 by a predetermined gain G and then added to the outer loop controller integrator input in adder 87. Basing the action of the outer loop integral term partially on the integral terms of the inner local controllers counteracts the potential problem that the outer loop integrator might not approach the required value because the inner loop integrators could maintain a non-zero state and not decay to zero. The sharing of integral action can be beneficial even in combination with the outer-band unwinding integral controller, because the outer loop integrator would only approach the required value as the inner integrators unwind so that the outer loop error deviates from zero. Using this sharing approach, the outer integral can begin updating even while the inner integrators are active and without necessitating that the outer error deviate from zero. Thus, the outer loop converges to the total required control action even if standard integrators are used in the inner loop, and converges more rapidly if outer-band unwinding integrators are used. Predetermined gain G is selected to calibrate the outer loop sensitivity to the inner loop integral terms.

What is claimed is:

1. Electrified vehicle apparatus comprising:
 a battery pack comprising series-connected battery units providing a main voltage;
 a plurality of DC/DC converters, each having an input powered by a respective battery unit;
 a low-voltage bus, wherein the DC/DC converters have respective outputs coupled in parallel to the low-voltage bus;
 a central module having an outer loop controller generating a target current adapted to regulate a bus voltage on the low-voltage bus to a predetermined voltage, and having an allocator distributing the target current into a plurality of allocated current commands for respective DC/DC converters according to respective states of charge of the battery units connected to the DC/DC converters; and
 a plurality of local controllers each adjusting a current of a respective DC/DC converter, wherein each local controller receives a respective allocated current command as a respective feedforward control variable, and wherein each local controller uses an error between the bus voltage and the predetermined voltage as a respective feedback control variable.

2. The apparatus of claim 1 wherein each local controller includes an outer band unwinding integral controller with an integral output that is substantially zero when the local controller is at steady state.

3. The apparatus of claim 2 wherein each integral controller includes a dead-zone function setting to zero the error to be integrated when the error is less than a threshold.

4. The apparatus of claim 3 wherein each integral controller further includes a ramp-down function to drive any non-zero integral output to zero when the error is less than the threshold.

5. The apparatus of claim 4 wherein the ramp-down function is comprised of feedback of the non-zero integral output as an input of the integral controller.

6. The apparatus of claim 5 wherein the feedback is comprised of a gain factor inversely proportional to the magnitude of the error.

7. The apparatus of claim 1 wherein each local controller includes a proportional-integral control for integrating the error to generate a respective integral output, and wherein the outer loop controller includes an outer integral control responsive to a sum of the integral outputs of the local controllers.

8. The apparatus of claim 7 wherein the sum of the integral outputs is scaled and added to an input of the outer integral control.

9. The apparatus of claim 1 wherein each local controller includes an outer band unwinding integral controller with an integral output that is substantially zero when the local controller is at steady state, wherein each local controller includes a proportional-integral control for integrating the error to generate a respective integral output, and wherein the outer loop controller includes an outer integral control responsive to a sum of the integral outputs of the local controllers.

10. The apparatus of claim 9 wherein each local controller includes a dead-zone function setting to zero the error to be integrated when the error is less than a threshold, and wherein each local controller further includes a ramp-down function to drive any non-zero integral output to zero when the error is less than the threshold.

11. A controller for a DC/DC converter in a plurality of parallel converters powered by respective battery units, comprising:
 a feedforward section receiving an allocated current command from an outer voltage controller to generate a first control variable;
 a feedback section receiving a common output of the parallel converters to generate a second control variable according to a voltage error; and
 an adder adding the control variables to adjust a current from the DC/DC converter.

12. The controller of claim 11 wherein the feedback section includes an outer band unwinding integral controller with an integral output that is substantially zero when the controller is at steady state.

13. The controller of claim 12 wherein the integral controller includes a dead-zone function setting to zero the error to be integrated when the voltage error is less than a threshold.

14. The controller of claim 13 wherein the integral controller further includes a ramp-down function to drive any non-zero integral output to zero when the voltage error is less than the threshold.

15. The controller of claim 14 wherein the ramp-down function is comprised of feedback the non-zero integral output as an input of the integral controller.

16. The controller of claim 15 wherein the feedback is comprised of a gain factor inversely proportional to the magnitude of the voltage error.

17. The controller of claim 11 wherein the feedback section includes a proportional-integral control for integrating the voltage error to generate a respective integral output, and wherein the controller is adapted to transmit the integral output to the outer voltage controller.

18. The controller of claim 11 wherein the feedback section includes an outer band unwinding integral controller with an integral output that is substantially zero when the controller is at steady state, wherein the feedback section includes a proportional-integral control for integrating the voltage error to generate a respective integral output, and wherein the controller is adapted to transmit the integral output to the outer voltage controller.

19. A method of controlling a DC/DC converter in a plurality of parallel converters powered by respective battery units, comprising the steps of:
receiving an allocated current command from an outer voltage controller;
generating a feedforward control variable as a function of the allocated current command;
receiving a common output voltage of the parallel converters;
generating a feedback control variable according to integration of an error between the common output voltage and a setpoint voltage; and
adding the control variables to adjust a current from the DC/DC converter.

20. The method of claim 19 further comprising the step of setting to zero the error to be integrated when the error is less than a threshold.

* * * * *